July 11, 1961     H. S. BRETZNER     2,992,039

AUTOMOTIVE VEHICLE SIDE DOOR AND ROOF CONSTRUCTION

Filed Aug. 24, 1959     4 Sheets-Sheet 1

INVENTOR.
Hans S. Bretzner
BY
S. C. Thorpe
ATTORNEY

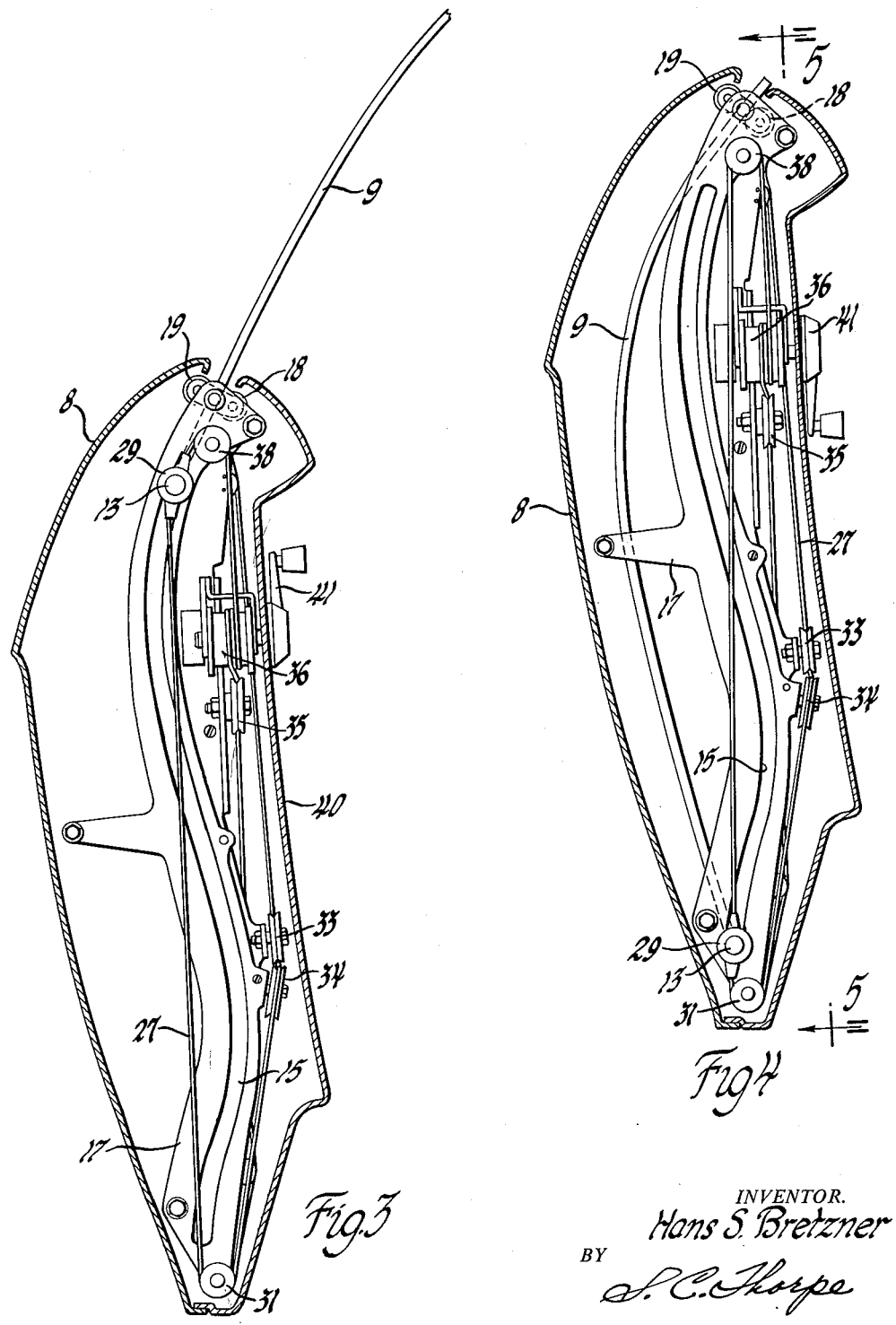

July 11, 1961  H. S. BRETZNER  2,992,039
AUTOMOTIVE VEHICLE SIDE DOOR AND ROOF CONSTRUCTION
Filed Aug. 24, 1959  4 Sheets-Sheet 3

INVENTOR.
Hans S. Bretzner
BY
S. C. Thorpe
ATTORNEY

INVENTOR.
Hans S. Bretzner
BY
S. C. Thorpe
ATTORNEY

__United States Patent Office__

2,992,039
Patented July 11, 1961

2,992,039
AUTOMOTIVE VEHICLE SIDE DOOR AND
ROOF CONSTRUCTION
Hans S. Bretzner, Birmingham, Mich., assignor to General Motors Corporation, Detroit, Mich., a corporation of Delaware
Filed Aug. 24, 1959, Ser. No. 835,632
1 Claim. (Cl. 296—44)

This invention relates to automotive vehicles, and particularly to facilitating egress and ingress of the driver or passengers thereinto.

It has long been a problem to provide increased freedom for persons entering and leaving the passenger compartment of closed type autmotive vehicles, particularly automobiles, via the side doors. Numerous attempts have been made to solve this problem, with most of them involving arrangements for elevating the roof or a portion thereof in conjunction with opening the door. Retractible or swivel seats have also been proposed to alleviate restriction of the doorway. The current trend toward general lowering of the automobile body profile with resultant reduction in passenger head room has aggravated this general problem.

Also, there has been an increasing interest in the industry toward developing a low cost rigid roof structure for automobiles, arranged for automatic removal and stowage in the trunk space at one end of the passenger compartment. Such stowage of the conventional full width rigid roof, either as a one-piece unit or in foldable longitudinal sections, has heretofore been complicated and expensive because of the limited trunk space between the wheel housings in present day automobiles.

The instant invention has as its principal object to provide an improved door and rigid roof construction for facilitating passenger egress and ingress, and which further accomplishes substantial narrowing of the roof panel width as would enable its stowage in a relatively limited space.

The invention further improves automotive vehicles through increasing driver and passenger visibility, as well as enhancing the external appearance of such vehicles.

The means by which these and other objects and advantages are obtained will be more clearly understood from the following description of one illustrative embodiment of the invention, having reference to the drawings wherein:

FIGURE 3 is a further enlarged view of the door per se, in section similar to FIGURE 2.

FIGURE 4 is a view similar to FIGURE 3, but showing the window in its retracted position within the door housing, the section being taken substantially along the line 4—4 of FIGURE 5.

Referring now in detail to the drawings, the body shell of a closed type automobile is designated generally by the numeral 1, and includes a roof panel 2 and side panels 3 (only that on the left side being illustrated).

Figure 1:
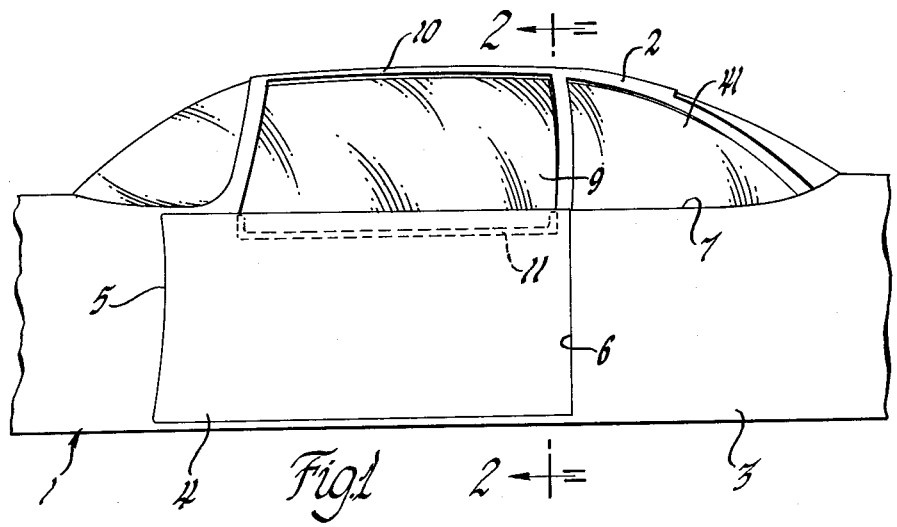
FIGURE 1 is a side elevational view of the body shell of an automotive vehicle having my improved door and roof construction.
Figure 2:
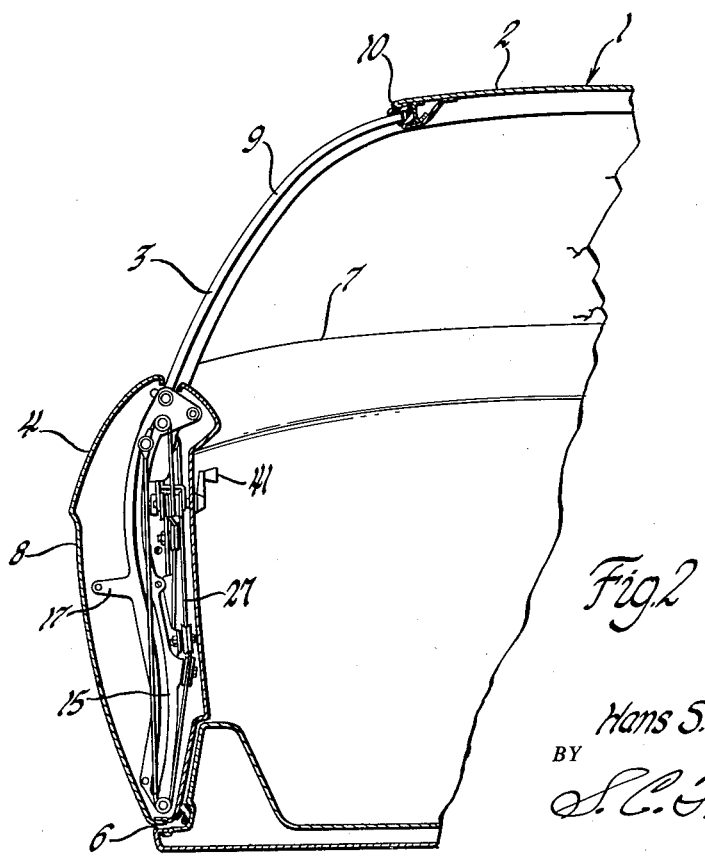
FIGURE 2 is an enlarged transverse sectional view of one half of the body of FIGURE 1, taken substantially on the line 2—2 of FIGURE 1.

A door 4 is suitably hinged (by means not shown) along its forward end 5 and forms a closure for opening 6 in the side 3 of the body. Substantially the lower half of the door (extending below the belt line 7) comprises a hollow housing 8 into which a window member 9 is retractable. When fully extended outward of the door housing 8, as shown in FIGURES 1 and 2, this window member defines the upper half of the door and terminates at its upper extremity in sealing abutment with the adjacent inboard side edge 10 of the roof panel. When so extended, the lower portion of the window remains within the upper part of the housing 8.

As clearly shown in FIGURE 2, the roof panel 2 is of relatively narrow width with respect to the width of vehicle at the belt line 7, and the lower portion of the door as constituted by the housing 8 extends generally vertically below the belt line. Thus the outboard edge 10 of the roof panel terminates at a substantial distance inboard of the door housing 8. In order that the window member may complement the lateral extent of the roof panel when the window member is in its raised or extended position, the window member is formed as seen in FIGURE 2 with a substantial curvature in section transverse to the vehicle.

Figure 5:
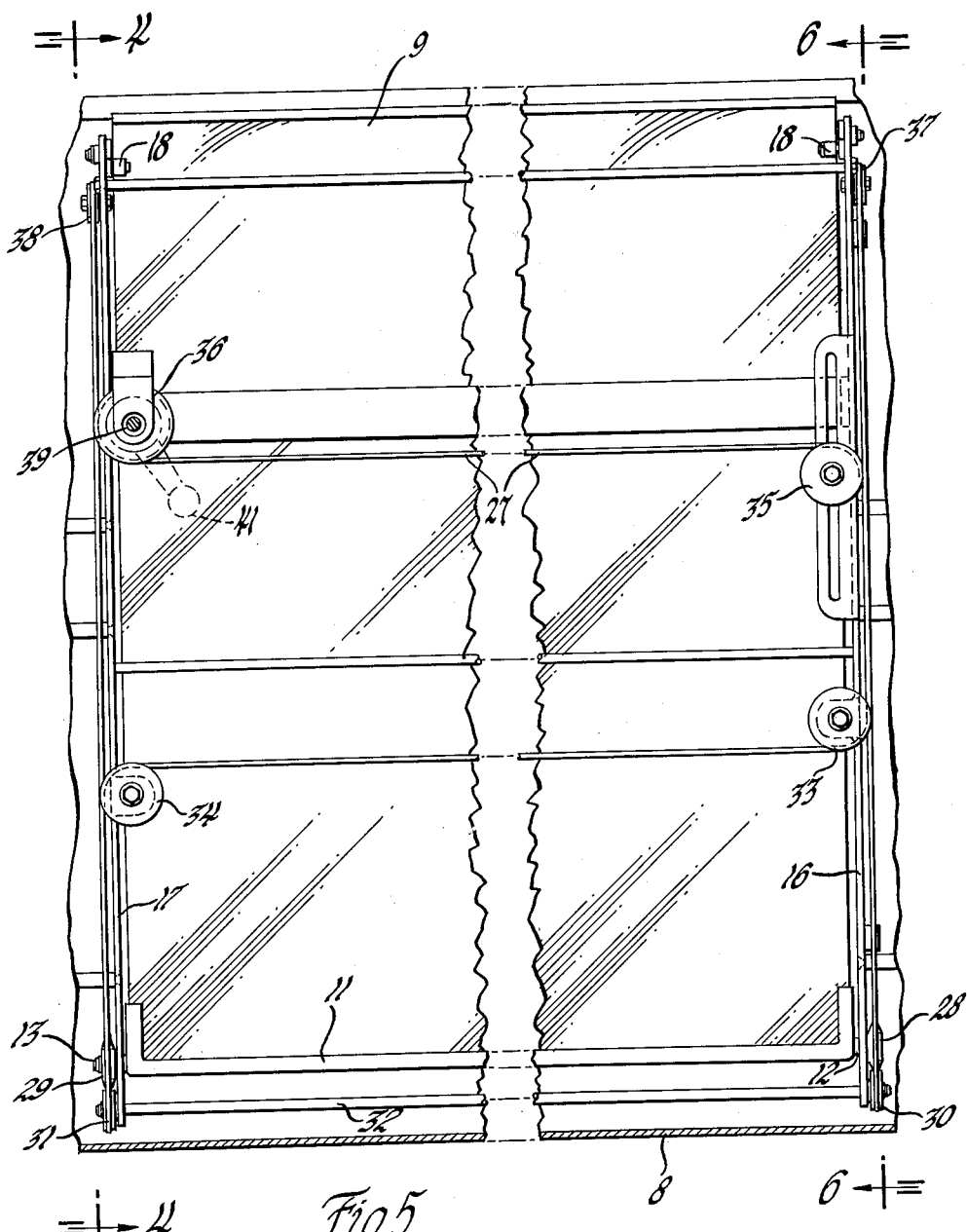
FIGURE 5 is a still further enlarged view of the door with parts broken away and taken from inside the vehicle body in the direction of the arrow 5—5 of FIGURE 4.
Figure 6:
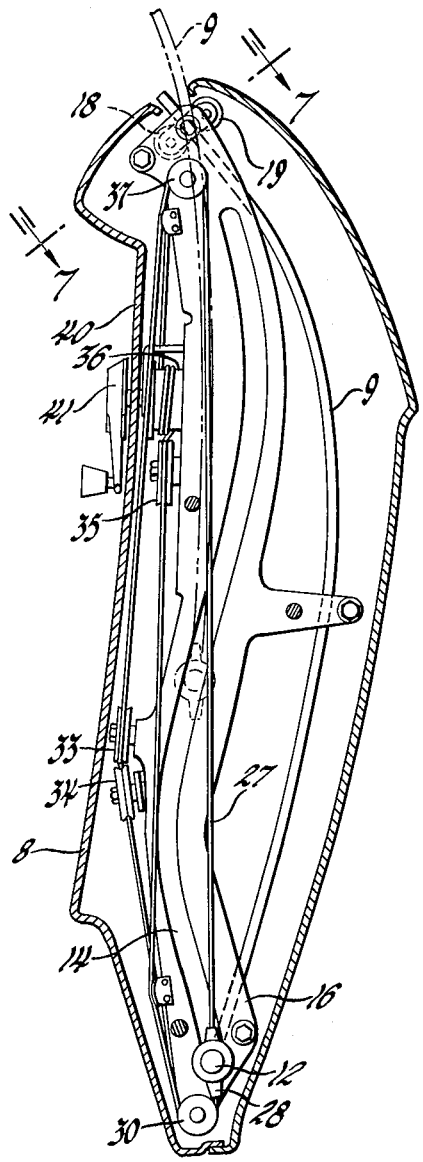
FIGURE 6 is a transverse sectional view through the door, taken generally along the line 6—6 of FIGURE 5.
Figure 7:
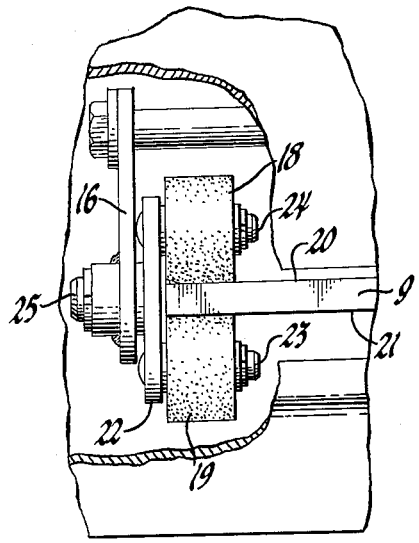
FIGURE 7 is an enlarged fragmentary view in section along the line 7—7 of FIGURE 6.

The window member is shown in its fully retracted position within the housing 8 in FIGURES 4, 5 and 6. Because of its curved section, special guiding means for it within the housing 8 are provided. The lower edge of the window member is reinforced with a frame piece 11, the opposite ends 12 and 13 of which extend beyond the forward and rearward ends of the window member and function as cam followers slidable in curved cam slots 14, 15 (FIGURES 3 and 6). These cam slots are provided in brackets 16, 17 fixed within the housing 8 and extending the full height thereof at each end of the housing. During elevation and lowering of the window member 9 its lower end movements are thus controlled by the cam slots 14, 15, which are shown as of generally S shape. Cooperating with these cam followers and cam slots in guiding and laterally supporting the window member adjacent each of its forward and rearward ends are a pair of rollers 18 and 19, the forward pair of which are most clearly shown in FIGURE 7. These rollers rollably engage the respective outboard and inboard surfaces 20, 21 of the window member during its vertical movement. A bracket 22, to which the rollers are mounted for axial rotation by pins 23 and 24, has an axle portion 25 journalled within the S-shaped brackets 16, 17 for pivotal movement about axes parallel to and intermediate the roller axes formed by their pins 23, 24. Thus, during movement of the window member the rollers 18, 19 cooperate with the slots 14 and 15 in laterally supporting the window member, it being noted that the engagement of the window member by these rollers occurs at a substantial height above the uppermost raised portion of the cam followers in their slots 14, 15.

The means for actuating the window member between its retracted and extended positions is illustrated in the form of a cable and pulley arrangement. A continuous cable 27 is anchored as by clamps 28 and 29 to the cam follower extensions 12, 13 and traverses over pulleys 30 and 31 which are journalled for rotation on fixed axes by a shaft 32 which extends along the bottom of the door housing and is secured therein to the brackets 16, 17. Additional pulleys, also rotatable about fixed axes provided by pins mounted to the brackets 16, 17, are shown at 33, 34, 35, 36, 37 and 38. The pin 39 of the pulley 36 is fixed thereto and extends through the inner panel 40 of the door housing and mounts a crank handle 41. Starting with the connecting clamp 28 at the rear end of the door, the cable 27 extends upwardly over the pulley 35 thence rearwardly of the door, under the pulley 36, thence upwardly over pulley 38 and downwardly to the clamp 29 and around pulley 31, thence upwardly over pulley 34 and forwardly across to pulley 33, upwardly and over pulley 37, then back down around pulley 30 to the clamp 28.

It should be understood that the edge 10 of the roof panel is continued rearwardly of the door above the rear side window 41 (FIGURE 1) in maintaining the relatively narrow width of the roof panel, and that in the case of a four door automobile having two doors on each side their window members would both be curved similarly to that of the window member 9 shown. Such narrowing of the rigid roof panel relative to the body width at the belt line, in conjunction with the inboard curvature of the side window members and the cam and follower means 12, 13, 14, 15 and supplementing roller guiding means 18, 19 therefor, as described, not only solves the problem of providing increased headroom during passenger egress and ingress but also eliminates the need for a rigid roof panel whose width is too great to enable design of economically feasible means for its stowage within the vehicle at a point longitudinally of the passenger compartment.

While only a single preferred embodiment of the invention has been disclosed, it is appreciated that numerous minor changes in the construction and arrangement of the parts may be made without departing from the spirit and scope of the invention as defined in the following claims.

I claim:

In an automotive vehicle having a side door for egress and ingress of passengers, a roof panel of relatively narrow width with respect to the transverse dimension of the vehicle opposite the lower portion of said door, said door including a hollow housing extending generally vertically from its lower end to the belt line and a window member retractable within said housing and extendable therefrom upwardly and inboard of the vehicle into abutment with the adjacent side edge of the roof panel, said window member being curved in section transversely of the vehicle such that when in its fully extended position and the door is closed the upward and inboard portion of the window member constitutes an outboard extension of said roof panel, means within said door housing for controlling the retracting and extending movements of the window member, said means including a generally vertical fixed guide slot of S shaped curvature in the plane of the door, a follower member secured to the window member and guidably engaged in said slot, a pair of rollers rollably engaging the respective inboard and outboard surfaces of the window member, said rollers having their axes located below the upper extremities of said housing and above the extreme upper extended portion of said follower, and a bracket supporting said rollers for axial rotation, said bracket having a pivotal connection with said housing about an axis parallel to and intermediate the rolling axes of the rollers.

References Cited in the file of this patent

UNITED STATES PATENTS

| | | |
|---|---|---|
| 2,000,561 | Haberstump | May 7, 1935 |
| 2,059,027 | Potter | Oct. 27, 1936 |
| 2,763,508 | Gelfand | Sept. 18, 1956 |
| 2,793,907 | Hess | May 28, 1957 |
| 2,798,761 | Himka | July 9, 1957 |
| 2,901,244 | Jones | Aug. 25, 1959 |

FOREIGN PATENTS

| | | |
|---|---|---|
| 750,380 | France | May 22, 1933 |
| 961,405 | France | Nov. 21, 1949 |
| 729,407 | Great Britain | May 4, 1955 |